Dec. 27, 1938.　　　E. E. BLONDEAU　　　2,141,590
RESISTIVITY METER
Filed Oct. 30, 1937
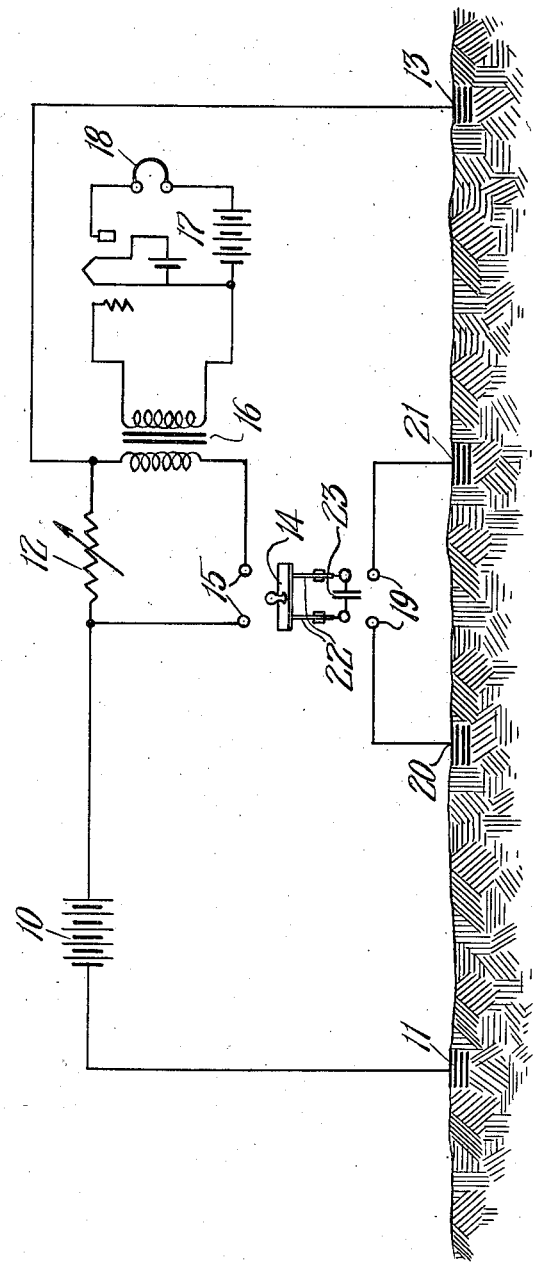
INVENTOR.
Ernest E. Blondeau
BY
Kenyon & Kenyon
ATTORNEYS.

Patented Dec. 27, 1938

2,141,590

UNITED STATES PATENT OFFICE 2,141,590

RESISTIVITY METER

Ernest E. Blondeau, Tulsa, Okla., assignor to Geophysical Research Corporation, New York, N. Y., a corporation of New Jersey Application October 30, 1937, Serial No. 171,822

10 Claims. (Cl. 175—182)

This invention relates to resistivity meters and more especially to devices for making measurements of the earth's resistivity.

Heretofore, earth resistivity measurements have been made by passing electrical current between a first pair of electrodes arranged in the earth and measuring the potential difference produced by such current between a second pair of electrodes arranged in the earth. Simultaneous readings are made of the current flow and potential difference and from these readings is calculated the resistivity, with the aid of the following equation:

$$\rho a = K \left( \frac{e}{i} \right)$$

where $\rho a$ = apparent resistivity
$e$ = potential difference between the second pair of electrodes.
$i$ = exciting current.
$k$ = numerical factor dependent upon the geometrical arrangement of the four electrodes.

An object of this invention is a device which obviates the necessity of simultaneously measuring the current flow and potential difference and gives a direct reading of the quantity $$\frac{e}{i}$$

In an apparatus embodying the invention, means are provided for producing current flow in the earth, the resistivity of which is to be measured. Also, in the earth are provided a pair of electrodes and the apparatus includes means for comparing the potential produced between said electrodes by the current flowing through the earth with a potential produced by the current in the exciting circuit external to the earth. From such comparison is obtained a direct reading of a quantity which is directly proportional to the earth's resistivity.

Other objects, novel features and advantages of this invention will become apparent from the following specification and accompanying drawings wherein the single figure illustrates diagrammatically one embodiment of the invention.

A battery 10 has one terminal connected to an electrode 11 set into the earth and has its other terminal connected through a variable and accurately calibrated resistance 12 with a second electrode 13 also set in the earth. A double-throw, double-pole switch 14 has a pair of stationary contacts 15, one of which is directly connected to one end of the resistance 12 while the other contact is connected through the primary of a transformer 16 with the remaining terminal of the resistance. The secondary of the transformer 16 is included in the input circuit of a vacuum tube amplifier 17 in the output circuit of which is arranged a pair of ear phones 18. The switch 14 has a second pair of stationary contacts 19, one of which is connected to an electrode 20 and the other of which is connected to an electrode 21, both of said electrodes being set into the earth. The switch further has a pair of movable contacts 22 which are selectively engageable either with the contacts 15 or with the contacts 19 and between the contacts 22 is connected a condenser 23.

In the use of the above-described apparatus to determine earth resistivity, the switch 14 is operated to bring the contacts 22 into engagement with the contacts 19 thereby charging the condenser to the potential produced between the electrodes 20 and 21 by the current flow through the earth between electrodes 11 and 13. The switch is then thrown to bring the contacts 22 into engagement with the contacts 15, thus connecting the charged condenser across the resistance 12 and the primary of transformer 16. The potential drop across the resistance 12 is $iR$ where $i$ is the current flowing in the exciting circuit and $R$ is the numerical value of the resistance 12. If the potential to which the condenser is charged is greater than $iR$ then the condenser will partially discharge through the primary of transformer 16 and the momentary flow of current thus produced will give a click in the ear phones 18. Conversely, if the potential across the condenser is less than $iR$, then a momentary current will flow in the opposite direction through the transformer primary, thus producing a click in the ear phones. By adjusting the resistance 12 to make $iR$ drop across the resistance 12 exactly equal to the potential of the condenser no click will be heard in the ear phones when the charged condenser is connected across the resistance 12. When this condition is obtained, the value of the resistance 12 is a measure of the earth resistivity.

The value of the condenser 23 is not critical, but the larger it is made, the greater is the sensivity of the system. For most purposes, it may be of the order of two microfarads. The length of time during which the condenser must be connected to the electrodes 20 and 21 is not critical but it must be longer than the time constant of the circuit including the condenser and the electrodes 20 and 21. The switch may be operated either mechanically or manually and in place of the ear phones may be used any suitable electrical means for producing an audible or visible signal.

It is to be understood that various modifications may be made in the device above described within the scope of the invention as defined in the appended claims. For example, a voltage divider may be substituted for the resistance 12 in which event, there will be no change in the value of the exciting current but there will be variation in the potential drop with which the voltage between electrodes 20 and 21 is compared.

I claim:

1. A resistivity meter comprising an exciting circuit for producing current flow in the earth, a resistance element in said circuit, a pair of electrodes in contact with the earth, a condenser, means for charging said condenser to the potential produced across said electrodes, and means for comparing the potential of the charged condenser with the potential drop across said resistance element.

2. A resistivity meter comprising an exciting circuit for producing current flow in the earth, a variable resistance element in said circuit, a pair of electrodes in contact with the earth, a condenser, means for charging said condenser to the potential across said electrodes, means for adjusting the potential drop across said resistance element to a value equal to the potential of the charged condenser, and means for indicating equality of said potentials.

3. A resistivity meter comprising a source of electrical current, a pair of electrodes connected to the terminals of said source, a variable resistance between one electrode and one terminal, a double-pole, double-throw switch having a first and a second pair of stationary contacts and a pair of movable contacts selectively engageable with said stationary contacts, an electrical indicator connected between one terminal of said resistance and one contact of said first pair and the other contact of said first pair being connected to the remaining terminal of said resistance, a condenser connected between said movable contacts, and a second pair of electrodes connected to said second pair of fixed contacts.

4. A resistivity meter comprising an exciting circuit for producing current flow in the earth, a resistance element in said circuit, a pair of electrodes in contact with the earth, a condenser, means for charging said condenser to the potential produced across said electrodes, an electrical indicator, and means for connecting the charged condenser and indicator in series across said resistance.

5. A resistivity meter comprising an exciting circuit for producing current flow in the earth, a resistance element in said circuit, a pair of electrodes in contact with the earth, a condenser, means for charging said condenser to the potential produced across said electrodes, current responsive means, and means for connecting the charged condenser and current responsive means in series across said resistance.

6. A resistivity meter comprising an exciting circuit for producing current flow in the earth, a resistance element in said circuit, a pair of electrodes in contact with the earth, a condenser, means for charging said condenser to the potential produced across said electrodes, audible signal producing means, and means for connecting the charged condenser and audible signal producing means in series across said resistance.

7. A resistivity meter comprising an exciting circuit for producing current flow in the earth, a resistance element in said circuit, a pair of electrodes in contact with the earth, a condenser, means for charging said condenser to the potential produced across said electrodes, a voltage detector, and means for connecting the charged condenser and voltage detector in series across said resistance.

8. A resistivity meter comprising a source of electrical current, a pair of electrodes connected to the terminals of said source, a variable resistance between one electrode and one terminal, a double-pole, double-throw switch having a first and second pair of stationary contacts, and a pair of movable contacts selectively engageable with said stationary contacts, a voltage detector connected between one terminal of said resistance and one contact of said first pair and the other contact of said first pair being connected to the remaining terminal of said resistance, a condenser connected between said movable contacts, and a second pair of electrodes connected to said pair of fixed electrodes.

9. A resistivity meter comprising a source of electrical current, a pair of electrodes connected to the terminals of said source, a variable resistance between one electrode and one terminal, current responsive means, a second pair of electrodes, a condenser, and means for selectively connecting said condenser in series with said second pair of electrodes and in series with said current responsive device across said resistance.

10. A resistivity meter comprising a source of electrical current, a pair of electrodes connected to the terminals of said source, a variable resistance between one electrode and one terminal, audible signal producing means, a condenser, and means for selectively connecting said condenser in series with said second pair of electrodes and in series with said signalling means across said resistance.

ERNEST E. BLONDEAU.